RE 25438

United States Patent Office 2,891,355
Patented June 23, 1959

2,891,355

PROCESS FOR THE GROWING AND ROOTING OF PLANTS IN A SYNTHETIC SOIL

Florian N. Nelson, Vicksburg, Miss.

No Drawing. Application August 22, 1957
Serial No. 679,759

3 Claims. (Cl. 47—58)

This invention relates to the growing of plants without the use of soil and it has for its principal object to provide a suitable medium in which certain species of plants will grow either for a long time or even for an indefinite time.

Many chemical agricultural systems have been proposed. They are usually based on so-called "water culture" (or "sand culture") but these systems have only been successful under very specialized conditions, when special treatment of the plants and constant supervision by experts could be provided. Also these systems were intended to grow crop plants.

This invention is essentially connected with a process of growing plants which are usually grown in beds or flower pots, as distinguished from crop plants for which the chemical agricultural system was mainly designed. The method of growing plants must therefore be simplified. This result is obtained by using an artificial substitute for the soil in which such plants are usually grown which consists of a synthetic material holding all the nutrient chemicals which the plants are in need of and also conducting the said chemicals toward and holding the plant roots in contact with said chemicals. This multiple use of the synthetic material forming the substratum is indispensable, because, in order to be able to use the system in homes, preparatory steps of a more complex kind must be eliminated and only the simplest possible manipulations such for instance as the addition of water can be expected to be performed.

The artificial substitute for the soil consists of a synthetic resin material holding the chemical plant nutrients and an agent promoting capillary action as well as a disinfecting or parasiticidal substance. This synthetic resin material must have a number of desirable properties in order to be usable in the manner indicated. It must not only have a very large surface and permit capillary fluid conduction but it must permit the intake and the exhalation of gases and it must further provide a stratum or layer in which the roots of the plant find a suitable grip.

As will be clear it is a major advantage to be able to cultivate plants and especially foliage plants by means of what is called "chemical agriculture," feeding essentially those minerals and other compounds which can be utilized by the plants to greatest advantage, within a uniform medium which can be fully surveyed and does not contain all kinds of unknown ingredients and unknown parasites. Further, the medium also should not attract parasites of any kind.

A special characteristic advantage however is seen in the use of a decorative synthetic material which has itself a neat and decorative appearance or which is even decorative to such a degree that transparent containers may be used through which the material may be displayed enhancing the colorful appearance of the plants by contrast or by matching of the colors.

The material best suited according to the invention which has all the desirable properties above mentioned, and which is suitable for chemically cultivating plants consists of crushed or shredded "Styrofoam," a polystyrene plastic made by inflating polystyrene cells with air, produced by the Dow Chemical Company, under the above trade name. Styrofoam is a non-permeable multi-cellular expanded product which contains about 97% of air by volume. The material thus has a very large number of cavities and cells. It may be produced in any color or may be colored after production and it is extremely light in weight, a factor which counts in connection with decorative articles for the home. When shredded so as to form small pieces the surface and air content per unit of volume is considerably increased.

The shredded Styrofoam is impregnated according to the invention in a manner described below with a suitable selected plant nutrient solution and with a detergent solution reducing the surface tension. This combination is necessary in order to produce a desired capillary action which action serves to provide the roots of the plants with the nutrients.

The substratum or medium in which the plants are grown thus essentially consists of the impregnated Styrofoam shreds and of water which must be supplied by the user.

The use of the shredded cullular polystyrene material produces a special advantage, denied to plants grown in a pot of ceramic material, namely that the access of oxygen to the roots is more freely had than it is in any pot or soil filled container. During growth, the roots of the plant need large quantities of oxygen which usually cannot be fully supplied in small pots. Thus the chemical system of growing approaches very much the ideal way of growing plants for ornamental purposes.

Likewise the escape of waste gases from the roots and especially the escape of carbon dioxide is complete and is much easier performed than the escape in the case of plants enclosed in small earth filled containers.

The decorative properties of the colored cellular polystyrene, such as Styrofoam show off to best advantage within a transparent container which may or may not be colored. However cultivation of plants in the manner indicated may take place in any vase, box or bed or even pot as the accessibility to view or to light is not essential and the advantages above mentioned would not be diminished by enclosing the cellular material on account of the air space available. The method of using the impregnated cellular material is moreover especially of advantage when used in connection with root cuttings which, if made to grow in a transparent container, are accessible to view and thus may form a valuable teaching aid.

Observations have shown that African violets, coleus, and hard to root species root very easily in the medium according to the invention.

*Example*

Crushed or shredded "Styrofoam" manufactured and marketed by the Dow Chemical Company, may first be mixed with a paint of the desired color which may contrast with or harmonize with the colors of the plants or flowers to be grown, if "Styrofoam" of the desired color is not available.

One bushel of the white crushed or shredded Styrofoam is then sprayed with one-half gallon of a solution prepared in the following manner:

To prepare the solution one gallon of water is used to which a detergent is added. Most surface active synthetic detergents are suitable for this purpose. Examples are the detergent marketed under the name "Aerosol" OT 10% which consists of isopropyl napththalene sulfosuccinate in a 10% solution. About 10 drops of this detergent are added to one gallon of water. Another detergent which may be used on account of its disinfecting and parasiticidal properties is Zephiran chloride, which is a cationic detergent consisting of a mixture of high molecular alkyl dimethyl benzyl ammonium chlorides. About 4 drops of this detergent are added to each gallon of water. Other detergents for instance one consisting of dimethyl benzyl dodecyl ammonium chloride may be used which also has parasiticidal properties.

The nutrient solution is prepared by adding to the above solution the following compositions, the proportions being in this case stated in gram per liter.

|  | Grams per liter |
|---|---|
| $MgSO_4$—$7H_2O$ | 0.780 |
| $Ca(H_2PO_4)_2$ | 0.405 |
| $KNO_3$ | 0.770 |
| $CaSO_4$ | 1.425 |
| $FeSO_4$ | 0.0025 |
| $MnSO_4$ | 0.0015 |
| $H_3BO_3$ | 0.0020 |
| $CuSO_4$ | 0.0001 |
| $ZnSO_4$ | 0.0001 |

These quantities are of course not absolutely fixed, the proportions varying to a certain extent. Essentially the nutrient solutions for growing plants should contain the following concentrations of soluble mineral substances.

|  | Parts per million parts of water |
|---|---|
| Potassium | 390 |
| Calcium | 80 |
| Magnesium | 24 |
| Nitrogen | 200 |
| Phosphorus | 65 |
| Sulphur | 32 |
| Iron | 0.10 |
| Manganese | 0.50 |
| Boron | 0.50 |
| Copper | 0.025 |
| Zinc | 0.025 |

Solutions of this type are in fact actually manufactured and marketed. After adding such a solution to the shredded Styrofoam it should be allowed to dry for at least 24 hours or more.

Then for every 7 gallons of colored Styrofoam one gallon of the white prepared Styrofoam is added. Then water is added filling the volume which is filled by the crushed Styrofoam about ¾ full of water.

It it is desired to insert a plant into a container, the roots of the plant should be cleaned and a container of a suitable size selected in accordance with the plant species to be grown in it. The container should be filled about half full of shredded Styrofoam prepared in the manner above described. The plant should be inserted upright and the shredded Styrofoam should be filled around the roots until the plant is firmly rooted. Then the container should be filled with about ¾ full of plain water.

For rooting plants water is to be added to the shredded Styrofoam in the proportion above indicated with the foliage spread above the water.

The shredded Styrofoam material may be prepared in the manner above stated with a nutrient and a detergent added and dried and may be marketed in this condition.

The cellular polystyrene plastic thus provides not only a specially favorable medium for growing plants in which plants root readily, but simultaneously also provides a special medium of high decorative quality which is unusual and outstanding and thus permits to provide especially attractive arrangements suitable not only for homes but also for window displays, hotel lobbies, restaurants, hospital rooms, and many other places where an especially decorative and attractive arrangement is needed. Its light weight greatly facilitates handling.

It will be obvious that certain changes may be made, especially with respect to the detergent and the nutrient used, without in any way departing from the essence of the invention as defined in the annexed claims.

What is claimed as new is as follows:

1. The method of growing plants by chemical agricultural process which consists in preparing shredded cellular expanded polystyrene by adding to a bushel of said polystyrene one-half gallon of a solution containing plant nutrients and several drops of a surface tension lowering detergent, in drying the shredded cellular expanded polystyrene during approximately 24 hours, in placing the roots of the plant to be grown into a quantity of shredded cellular polystyrene, adding the said prepared shredded cellular expanded polystyrene in the proportion of 7:1 and in adding water approximately to the extent of ¾ of the volume occupied by the shredded cellular polystyrene.

2. A method of chemical agriculture for growing and rooting plants which consists in preparing artificial soil comprising exclusively cellular expanded polystyrene, shredded into small pieces, the shreds surrounding a plant stem and root inserted into the artificial soil in large numbers, impregnating the expanded shredded polystyrene with a plant nutrient solution containing chemical nutrient agents after adding to the said solution a wetting agent, in preparing a bed containing a mixture of unprepared shredded cellular expanded polystyrene and prepared shredded cellular expanded polystyrene, adding water and in inserting the plant with its roots embedded between the shreds surrounding the plant and root and stem in large numbers into the shredded cellular expanded polystyrene.

3. A method of chemical agriculture for growing and rooting flowers which consists in preparing artificial soil comprising exclusively cellular expanded polystyrene, shredded into small pieces, the shreds surrounding the stem and root inserted into the artificial soil in large numbers, impregnating the expanded shredded polystyrene with a plant nutrient solution containing chemical nutrient agents after adding to said solution a wetting agent, in mixing the shredded cellular with paint before being impregnated for coloring it to add to its decorative properties, in preparing a bed containing a mixture of unprepared shredded cellular expanded polystyrene and prepared shredded cellular expanded polystyrene, adding water, and in inserting the flower with its roots embedded between the shreds surrounding the flower stem and root in large numbers into the shredded cellular expanded polystyrene.

References Cited in the file of this patent
UNITED STATES PATENTS

| 2,446,429 | Nelson | Aug. 3, 1948 |
| 2,618,901 | Braun | Nov. 25, 1952 |
| 2,753,277 | Smithers | July 3, 1956 |

OTHER REFERENCES

Publications: Onyx Technical Data Sheet No. Ind.–6, Product Ammonyx T, published 1952 by Onxy Oil and Chemical Co., Jersey City, New Jersey; two pages.

Southern Florist and Nurseryman (magazine), July 25, 1952, vol. 65, No. 18, pages 85, 86, 87, article "Substitutes For Sand in Propagating Cuttings," by Tschirhart.

Science News-Letter, Mar. 3, 1956, vol. 69, No. 9, page 133, article "Waste Cellophane As Gardening Aid."